C. J. LEGG.
Corn Husker, Sheller, and Cleaner.
No. 48,077.
Patented June 6, 1865.
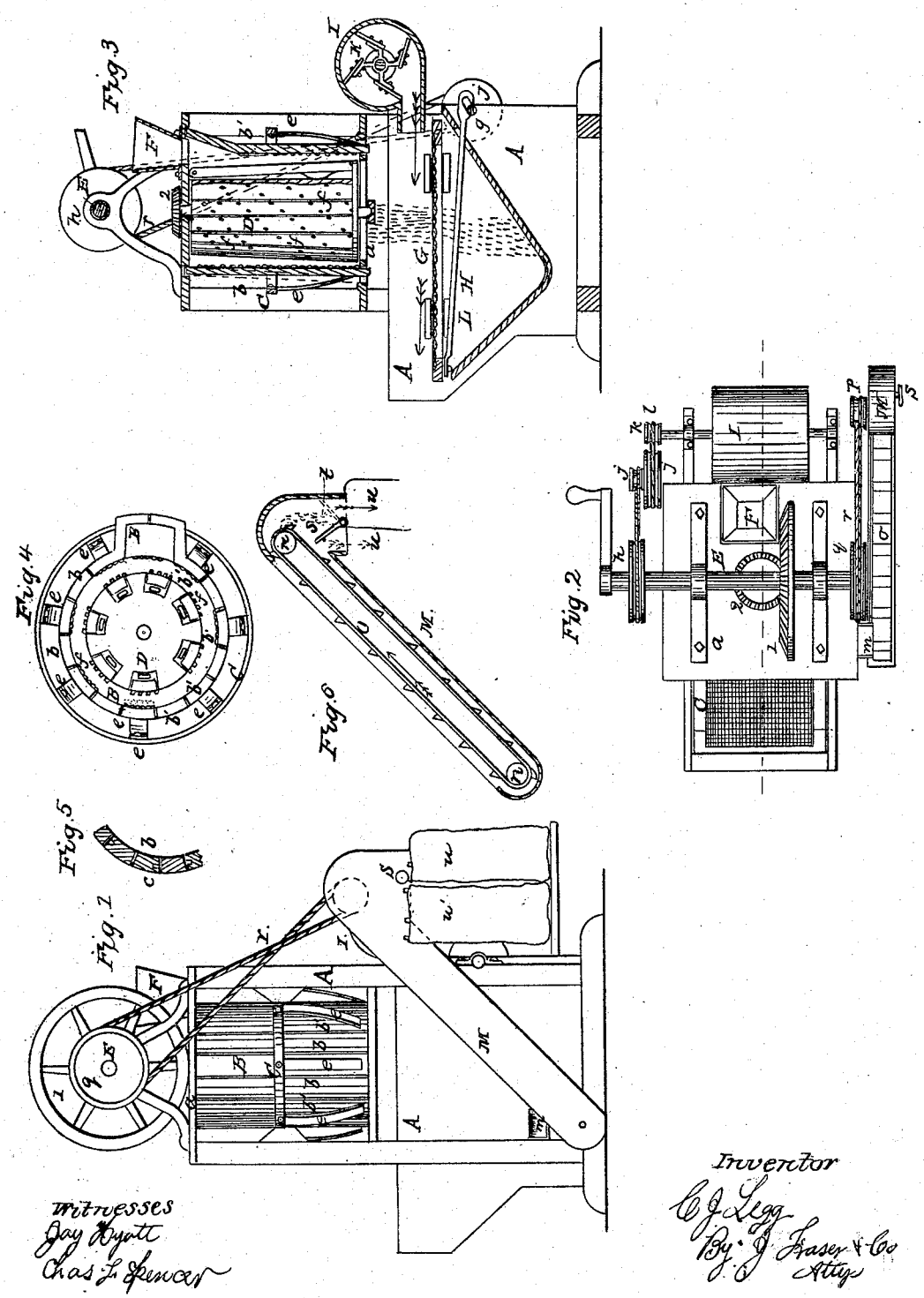

UNITED STATES PATENT OFFICE.

C. J. LEGG, OF PENN YAN, NEW YORK.

IMPROVED CORN HUSKER, SHELLER, AND CLEANER.

Specification forming part of Letters Patent No. 48,077, dated June 6, 1865; antedated May 28, 1865.

*To all whom it may concern:*

Be it known that I, CALEB J. LEGG, of Penn Yan, in the county of Yates and State of New York, have invented certain new and useful Improvements in Machines for Husking, Shelling, Cleaning, and Bagging Corn; and I do hereby declare that the following is a full and exact description thereof, reference being had to accompanying drawings, making part of this specification.

Figure 1 is a side elevation of my improved machine; Fig. 2, plan of the same; Fig. 3, a central longitudinal vertical section; Fig. 4, a diagram showing more particularly the form and arrangement of the husking and shelling cylinders; Fig. 5, a view showing the manner of suspending or hinging the upper ends of the shelling-staves; Fig. 6, a longitudinal vertical section of the bagging-elevator.

Like letters of reference indicate corresponding parts in all the figures.

My invention is an improvement on that patented to me on the 22d day of September, 1863, the shelling-cylinders which constituted the novelty of that device being the same in both.

My present improvement is designed to accomplish its work more thoroughly than in the old arrangement, and to furnish a more convenient and effective means of "bagging" the corn after it has been shelled and thoroughly cleaned.

As represented in the drawings, A is the frame and casing of the machine, which may be of any ordinary construction. In the top of this frame, between suitable plates, *a a*, is situated a hollow cylinder, B, of suitable size, the same being composed of alternate plane, vertical, metallic staves, *b b*, Fig. 4, fixed between the plates *a a*, and intermediate elastic staves, *b' b'*, which are provided on their inner sides with shelling-teeth. The upper ends of shelling-staves *b'* are provided with bearings *c c* on opposite sides, Fig. 5, which rest in small sockets of the fixed staves *b b*, so that the shelling-staves are suspended or hinged at the top, not only in such a manner as to hold them in place, but also so as to allow them to spring back at their lower ends in mortises *d d*, Fig. 3, for the purpose as indicated by red lines. This is for the purpose of allowing the staves to adapt themselves to the size of the ears of corn that pass through. The lower ends of the staves are pressed in by means of flat springs *e e*, secured to a surrounding ring, C, or by some equivalent arrangement.

Within the hollow cylinder B is situated a drum, D, which is preferably in the form of a frustum of a cone, smallest at the top, though, if desired, it may be a cylinder. This drum may be provided with vertical grooves having spring-staves fitting therein, hinged at the top and pressed out by springs at the bottom, similarly to those of the outer hollow cylinder. This drum is provided with teeth *f f*, arranged spirally around it, as indicated in Fig. 3, for the purpose of carrying the ears downward to husk or shell. The drum is driven by means of a pinion, 2, on its spindle gearing with cog-wheel 1 on driving-shaft E. The corn is fed in between the cylinders through hopper F on top. Thus far the arrangement is essentially the same as that already patented to me.

At a suitable position beneath the shelling-cylinders, so that the corn will fall directly thereon, is situated a screen, G, having a longitudinal vibration by any suitable means, that represented in the drawings being a pitman, H, connecting with the crank of a shaft, *g*, which receives motion by means of suitable pulleys and bands, *h i j*, as clearly shown. The screen retains the cob, but allows the corn to pass.

At the rear of the machine, just above the screen, is situated a fan-chamber, I, in which is a fan, K, that throws a blast in the direction of the arrows, Fig. 3, directly through the falling corn, at right angles, before it reaches the screen, so as to perfectly clean it of all hulls and impurities. The fan is driven by any convenient means, that represented in the drawings being pulleys *j k* and band *l*.

Beneath the screen is a box or trough, L, which receives the corn. This trough at the bottom or angle is inclined laterally, and ends in a spout, *m*, which opens out through the side of the casing, and conducts the corn into the lower end of an inclined elevator attached to the side of the frame A. This elevator consists of a suitable casing, M, having rollers *n n*, respectively, at the opposite ends, around which passes an endless belt, *o*, with suitable buckets attached. The upper roller, *n*, is driven by means of a pulley, p, on its shaft connecting with a similar pulley, q, on the driving-shaft by means of a band, r. The upper end of the casing M is enlarged, and has situated centrally in its lower portion a valve, s, Fig. 6, substantially of the form shown, thus forming passages tt' on either side of the same. This arrangement is for the purpose of directing the stream of corn as it falls from the buckets above, either on one side or the other of the valve, as may be desired. To illustrate, when the valve is in the position indicated by black lines in Fig. 6, the cleaned corn will pass through the passage t into the bag u, Fig. 1; but when it is in the position indicated by red lines, the corn will pass through the passage t' into the bag u'. Thus, when one bag becomes filled, the valve can be changed to the opposite position, and the corn will flow into the other bag without any loss or delay. In ordinary devices the bag has to be removed and another inserted in its place, which occasions a loss or escape of a portion of the corn upon the floor or ground at the moment of changing. To accomplish this effect requires a peculiar combination and arrangement, the head of the case M being enlarged, so that the valve s will form a chute on either side of the center when turned in the proper position, and so situated relatively with the endless belt o that the contents of the buckets will fall thereon and be directed in the proper passage.

The construction and arrangement of this whole machine are such as to put it in the most compact and simple form for so effective an apparatus. It is designed more particularly for millers' and others' use, where large quantities of corn are to be shelled. In such the fan is necessary to clean it of impurities, and the improved elevator is also necessary to perform the raising and bagging of the corn with the least manual labor. In this machine, run by suitable power, a man and a boy are all that are required to attend it, whereas in ordinary machines, where the bagging has to be done by hand, several operators are required.

The construction of the shelling-cylinders is such as to perform the work with the greatest rapidity and with the best effect, and, forming a part of this combination and arrangement, is of the greatest consequence.

I do not claim, broadly, a valve capable of turning a current in opposite directions by merely changing its position; nor do I claim the shelling-cylinders B D, which are secured by the aforesaid Letters Patent granted to me September 22, 1863; but

What I claim as my invention, and desire to secure by Letters Patent, is—

In combination with the shelling-cylinders B D, constructed as described, and provided with the screen G and fan K, the arrangement of the bagging-elevator M with the valve s, the whole operating substantially as and for the purposes herein specified.

In witness whereof I have hereunto signed my name in the presence of two subscribing witnesses.

CALEB J. LEGG.

Witnesses:
CLEMT. W. BENNETT,
A. BUSSETT.